United States Patent
Eun et al.

(10) Patent No.: US 7,573,321 B2
(45) Date of Patent: Aug. 11, 2009

(54) HIGH VOLTAGE GENERATOR

(75) Inventors: Dong-Myung Eun, Gyeonggi-do (KR); Jung-Hwa Lee, Gyeonggi-do (KR)

(73) Assignee: Samsung Electronic Co., Ltd., Suwon-si, Gyeonggi-do (KR)

( * ) Notice: Subject to any disclaimer, the term of this patent is extended or adjusted under 35 U.S.C. 154(b) by 28 days.

(21) Appl. No.: 11/858,071

(22) Filed: Sep. 19, 2007

(65) Prior Publication Data

US 2008/0068069 A1    Mar. 20, 2008

(30) Foreign Application Priority Data

Sep. 19, 2006    (KR)    ............... 10-2006-0090476

(51) Int. Cl.
*G05F 1/10*    (2006.01)
*H03K 3/01*    (2006.01)
(52) U.S. Cl. ............................ 327/537; 327/536
(58) Field of Classification Search ............. 327/589, 327/534–537
See application file for complete search history.

(56) References Cited

U.S. PATENT DOCUMENTS 6,225,854 B1 *    5/2001    Cha ........................... 327/536
6,326,834 B1 *    12/2001    Akita et al. ................. 327/536
6,566,846 B1 *    5/2003    Voo ............................ 323/267

FOREIGN PATENT DOCUMENTS

| KR | 10-0257866 | 3/2000 |
| KR | 10-0462863 | 12/2004 |
| KR | 2006-0018047 | 2/2006 |

OTHER PUBLICATIONS

English language abstract of Korean Publication No. 10-0257866.
English language abstract of Korean Publication No. 10-0462863.
English language abstract of Korean Publication No. 2006-0018047.

\* cited by examiner

*Primary Examiner*—Dinh T. Le
(74) *Attorney, Agent, or Firm*—Marger Johnson & McCollom, P.C.

(57) ABSTRACT

A high voltage generator is provided. The high voltage generator may comprise a high voltage output node, a plurality of pumping stages, a plurality of charge transfer elements, and a field relieving unit. The plurality of pumping stages sequentially pump charges in response to a sequentially enabled plurality of pump signals and output the pumped charges, respectively. The plurality of charge transfer elements sequentially transfer the charges sequentially pumped by the plurality of pumping stages to the next pumping stage and transfer the charge of an output node of the last pumping stage to the high voltage output node. The field relieving unit reduces the voltage of the input terminal of at least one of the plurality of charge transfer elements. The high voltage generator reduces hot carrier injection in charge transfer transistors without decreasing pumping efficiency.

17 Claims, 8 Drawing Sheets

HIGH VOLTAGE GENERATOR

CROSS-REFERENCE TO RELATED PATENT APPLICATION

This application claims the benefit of Korean Patent Application No. 10-2006-0090476, filed on Sep. 19, 2006, in the Korean Intellectual Property Office, the disclosure of which is incorporated by reference.

BACKGROUND

1. Field of the Invention

The present invention relates to a semiconductor integrated circuit, and more particularly, to a circuit and method of generating a high voltage used in a semiconductor integrated circuit.

2. Description of the Related Art

With the development of semiconductor technology, the sizes of memory cells of semiconductor memory devices including DRAM (dynamic random access memory) have been reduced and the density of the memory cells has been increased. With this increase in density and decrease of size the external power voltage, such as a power supply voltage VCC has also decreased (for example, from 5V to 1.8V or 1.5V). Even when the power supply voltage is reduced, however, a voltage higher than the power supply voltage must be supplied to circuits, bit lines, and word lines of a semiconductor memory device. Accordingly, a high voltage generator generating a voltage higher than the power supply voltage is often required when the power supply voltage is low.

For example, when a sense amplifier is operated with a low power supply voltage, the operating speed of the sense amplifier is decreased. Thus, the sense amplifier requires a high voltage to be efficiently operated. Furthermore, a relatively higher voltage is required to increase a gate voltage for controlling the operations of transistors that execute an operation of precharging bit lines and an operation of writing data to memory cells at a high speed.

High voltage generators generally use a boost circuit to boost a voltage. However, the pumping efficiency of the boost circuit is deteriorated as the power supply voltage decreases. Accordingly, a high voltage generating circuit and method capable of maintaining pumping efficiency even with a low power supply voltage are needed.

SUMMARY

Embodiments of the present invention provide a high voltage generator capable of reducing hot carrier injection of a charge transfer transistor without deteriorating pumping efficiency.

According to an embodiment of the present invention, a high voltage generator comprises a high voltage output node, a plurality of boost nodes, a plurality of switches, and a field relieving unit. The plurality of boost nodes are sequentially boosted in response to a sequentially enabled plurality of pump signals, respectively. The plurality of switches sequentially connect the boost nodes and the high voltage output node such that charges boosted to a boost node are transferred to the next boosted node and charges boosted to the finally boosted node are transferred to the high voltage output node. The field relieving unit reduces the voltage of one of terminals of at least one of the plurality of switches, which receives the transferred charges.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 1:
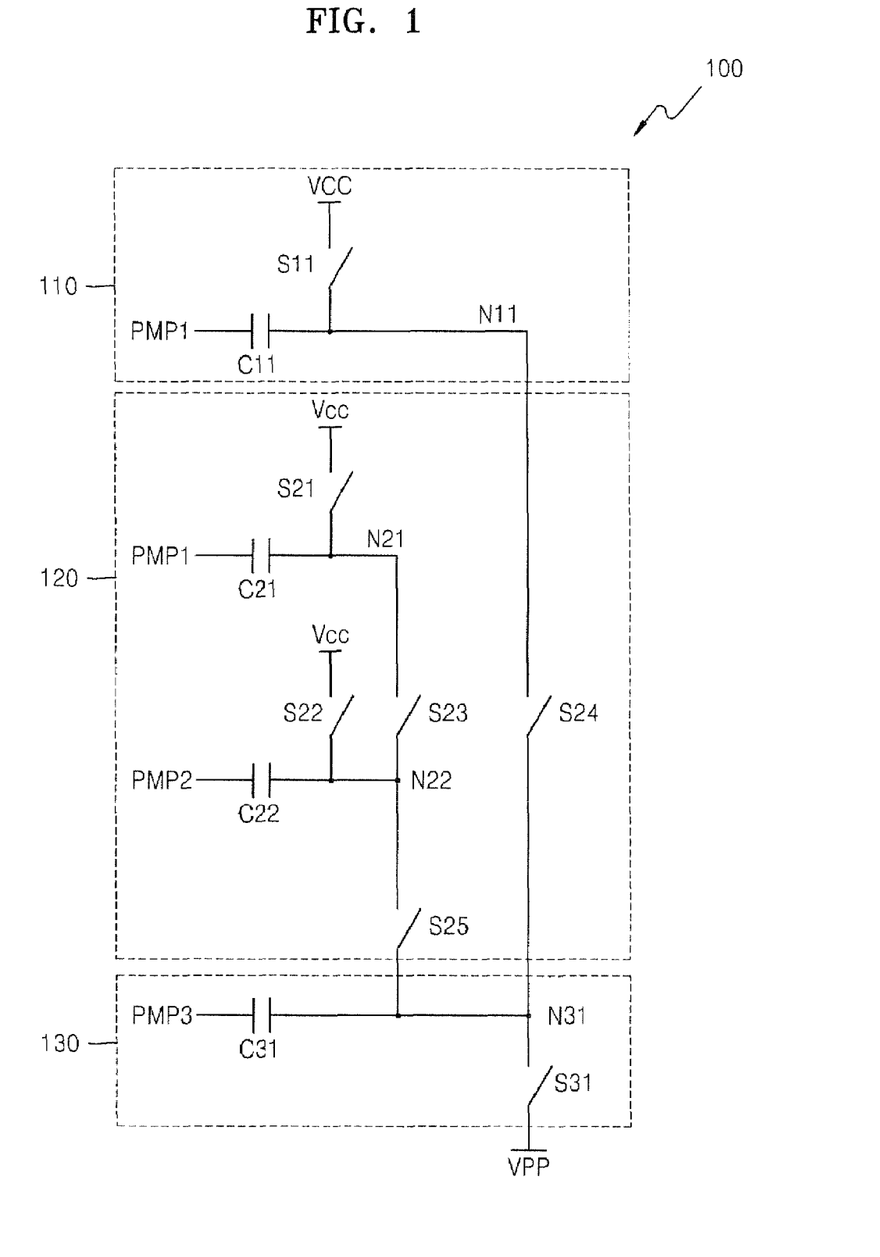
FIG. 1 is a diagram explaining the operation principle of a high voltage generator.

FIG. 1 is a diagram explaining the operation principle of a high voltage generator 100. Referring to FIG. 1, the high voltage generator 100 includes three pump circuits 110, 120, and 130. However, it will be understood by those of ordinary skill in the art that the number of pump circuits is not limited thereto.

The first, second, and third pump circuits 110, 120, and 130 sequentially execute pumping operations to generate a high voltage VPP. The first pump circuit 110 includes a first capacitor C11 and a switch S11 and the second pump circuit 120 includes second and third capacitors C21 and C22 and switches S21, S22, S23, S24, and S25. The third pump circuit 130 includes a fourth capacitor C31 and a switch S31. The pump circuits 110, 120, and 130 boost their boost nodes N11, N21, N22, and N31 to a voltage (for example, a voltage twice or three times a power supply voltage VCC) higher than the power supply voltage VCC.

The first pump circuit 110 drives a first boost node N11 in response to a first pump signal PMP1 and the second pump circuit 120 respectively drives a second boost node N21 and a third boost node N22 in response to the first pump signal PMP1 and a second pump signal PMP2. The third pump circuit 130 drives a fourth boost node N31 in response to a third pump signal PMP3.

The first pump signal PMP1 is used to respectively increase the charge of the first boost node N11 and the charge of the second boost node N21 through the first capacitor C11 and the second capacitor C21. The second pump signal PMP2 is used to increase the charge of the third boost node N22 through the third capacitor C22. The third pump signal PMP3 is used to increase the charge of the fourth boost node N31 through the fourth capacitor C31.

The second boost node N21 is connected to the third boost node N22 through the switch S23 to further increase the charge of the third boost node N22. The first and third boost nodes N11 and N22 are respectively connected to the fourth boost node N31 through the switches S24 and S25 to further increase the charge of the fourth boost node N31. The charge of the fourth boost node N31 generates the high voltage through the switch S31. The first boost node N11 and the third boost node N22 are precharged to the power supply voltage VCC through the switches S11, S21, and S22.

Figure 2:
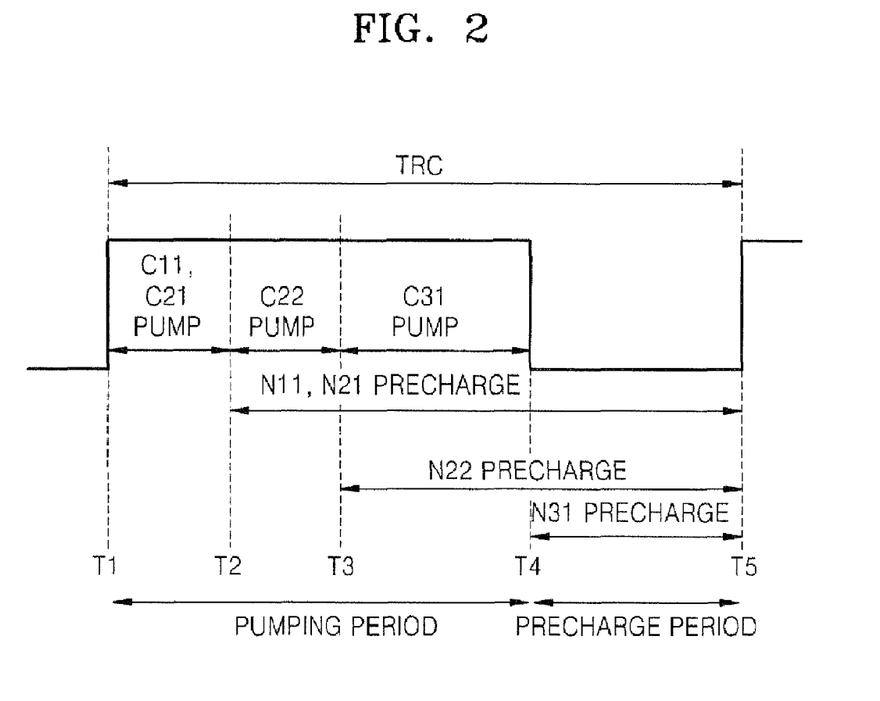
FIG. 2 illustrates the operation timing of the high voltage generator illustrated in FIG. 1.

FIG. 2 illustrates the operation timing of the high voltage generator illustrated in FIG. 1. Referring to FIG. 2 a pumping operation and a precharging operation are carried out during a row cycle time TRC of a semiconductor memory device. A period between T1 and T4 is a pumping period during which the first, second, third, and fourth capacitors C11, C21, C22, and C31 carry out pumping operations. The pumping period includes a first pumping stage between T1 and T2, a second pumping stage between T2 and T3, and a third pumping stage between T3 and T4. A period between T4 and T5 is a precharge period during which the first, second, third, and fourth boost nodes N11, N21, N22, and N31 are precharged.

In the first pumping stage, the first capacitor C11 and the second capacitor C21 execute the pumping operation in response to the first pump signal PMP1. The third capacitor C22 performs a pumping operation in response to the second pump signal PMP2 in the second pumping stage and the fourth capacitor C31 executes a pumping operation in response to the third pump signal PMP3 in the third pumping stage.

The first boost node N11 and the second boost node N21 are precharged to the power supply voltage VCC by the switches S11 and S21 during a period between T2 and T5, and the third boost node N22 is precharged to the power supply voltage VCC by the switch S22 during a period between T3 and T5.

Figure 3:
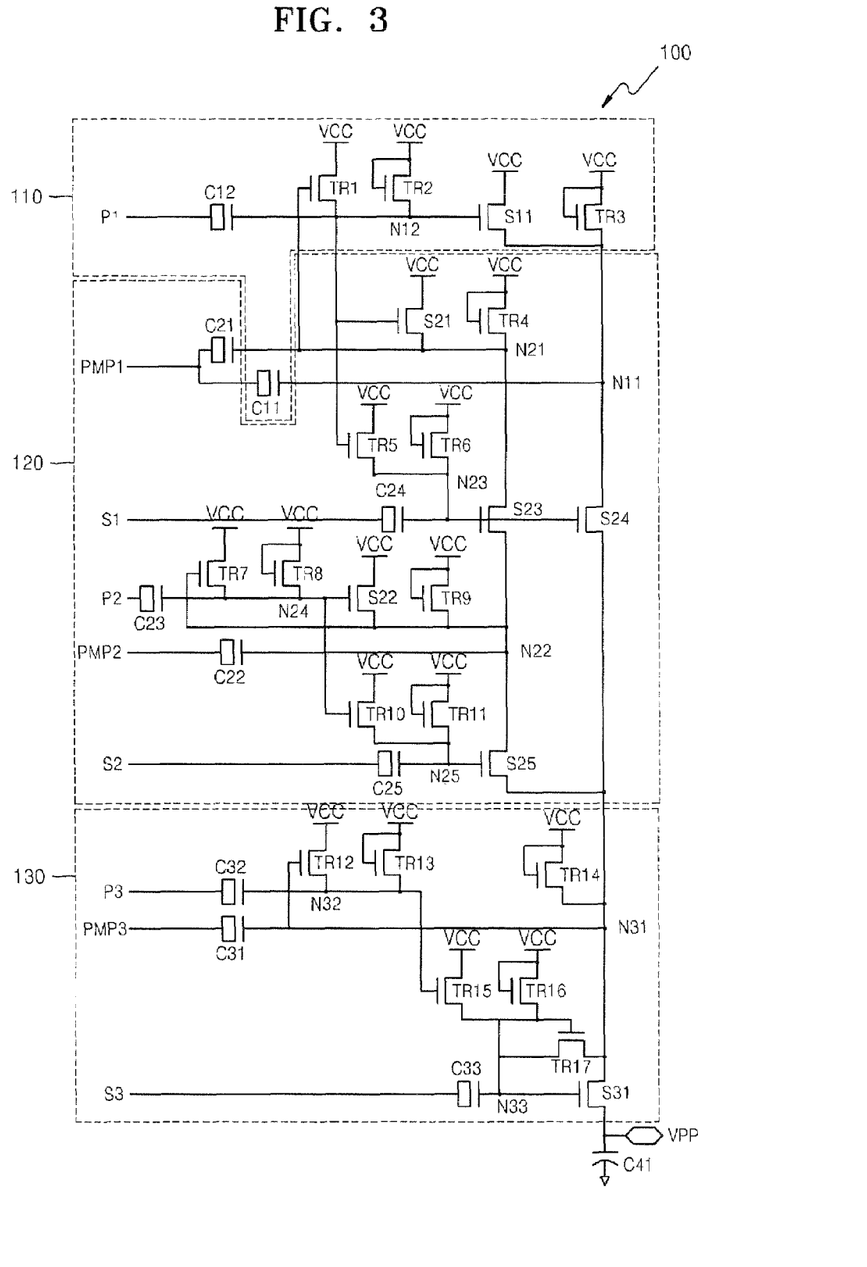
FIG. 3 is a circuit diagram of the high voltage generator illustrated in FIG. 1.

FIG. 3 is a circuit diagram of the high voltage generator 100 illustrated in FIG. 1. Referring to FIG. 3, switches of the high voltage generator 100 may be configured of transistors. However, it will be understood by those of ordinary skill in the art that the switches of the high voltage generator 100 are not limited to transistors.

Nodes N11 and N12 are respectively precharged to a voltage VCC-Vt by a transistor TR3 and a transistor TR2, which are diode-connected to the source of a first power voltage VCC. Here, Vt is the threshold voltage of the transistor TR4. The first power voltage VCC may be the power supply voltage. However, it will be understood by those of ordinary skill in the art that the first power voltage VCC is not limited thereto.

The node N12 is boosted by a capacitor C12 to which a first precharge signal P1 having a high level, that is, the first power voltage VCC, is applied. The node N11 is further precharged through a transistor S11 that is gated by the boost node N12 connected to the source of the first power voltage VCC and boosted. The node N11 is boosted by the capacitor C11 to which the first pump signal PMP1 having the power voltage VCC is applied.

A node N21 is precharged to at least a voltage VCC-Vt by a transistor TR4 that is diode-connected to the source of the first power voltage VCC. Here, Vt is the threshold voltage of the transistor TR4. The node N12 is further precharged by a transistor TR1 connected to the source of the first power voltage VCC and gated by the boosted node N21, and the node N21 is further precharged by a transistor S21 having a gate to which the node N12 is connected.

A node N23 is precharged to at least a voltage VCC-Vt by a transistor TR6 that is diode-connected to the source of the first power voltage VCC and further precharged by a transistor TR5 connected to the source of the first power voltage VCC and gated by the node N12. Here, Vt is the threshold voltage of the transistor TR6. In addition, the node N23 is boosted by a capacitor C24 to which a first switch signal S1 having a voltage higher than the first power voltage VCC is applied. The charges of the node N21 and the node N11 are respectively transferred to a node N22 and a node N31 through a transistor S23 and a transistor S24, which are gated by the boosted node N23.

A node N24 is precharged to at least a voltage VCC-Vt by a transistor TR8 that is diode-connected to the source of the first power voltage VCC and further precharged by a transistor TR7 connected to the source of the first power voltage VCC and gated by the node N22. Here, Vt is the threshold voltage of the transistor TR8. In addition, the node N24 is boosted by a capacitor C23 to which a second precharge signal P2 having a voltage higher than the first power voltage VCC is applied.

The node N22 is precharged to a voltage VCC-Vt by a transistor TR9 that is diode-connected to the source of the first power voltage VCC and further precharged by a transistor S22 connected to the source of the first power voltage VCC and gated by the boosted node N24. Here, Vt is the threshold voltage of the transistor TR9. In addition, the node N22 is boosted by a capacitor C22 to which the second pump signal PMP2 having a voltage higher than the first power voltage VCC is applied.

A node N25 is precharged to at least a voltage VCC-Vt by a transistor TR11 that is diode-connected to the source of the first power voltage VCC and further precharged by a transistor TR10 connected to the source of the first power voltage VCC and gated by the boosted node N24. Here, Vt is the threshold voltage of the transistor TR11. In addition, the node N25 is boosted by a capacitor C25 to which a second switch signal S2 having a voltage higher than the first power voltage VCC is applied. The charge of the node N22 is transferred to the node N31 through a transistor S25 gated by the boosted node N25.

A node N32 is precharged to at least a voltage VCC-Vt by a transistor TR13 that is diode-connected to the source of the first power voltage VCC and further precharged by a transistor TR12 connected to the source of the first power voltage VCC and gated by the boosted node N31. Here, Vt is the threshold voltage of the transistor TR13. Furthermore, the node N32 is boosted by a capacitor C32 to which a third precharge signal P3 having a voltage higher than the first power voltage VCC is applied.

A node N33 is precharged to at least a voltage VCC-Vt by a transistor TR16 that is diode-connected to the source of the first power voltage VCC and further precharged by a transistor TR15 connected to the source of the first power voltage VCC and gated by the boosted node N32. Here, Vt is the threshold voltage of the transistor TR16. In addition, the node N33 is boosted by a capacitor C33 to which a third switch signal S3 having a voltage higher than the first power voltage VCC is applied. The charge of the boosted node N33 is transferred to the node N31 through a transistor TR17 gated by the node N32.

The node N31 is precharged to at least a voltage VCC-Vt by a transistor TR14 that is diode-connected to the source of the first power voltage VCC. Here, Vt is the threshold voltage of the transistor TR14. Furthermore, the node N31 is boosted by a capacitor C31 to which the third pump signal PMP3 having a voltage higher than the first power voltage VCC is applied. The charge of the node N31 generates a high voltage VPP through a transistor S31 gated by the boosted node N33.

Figure 4:
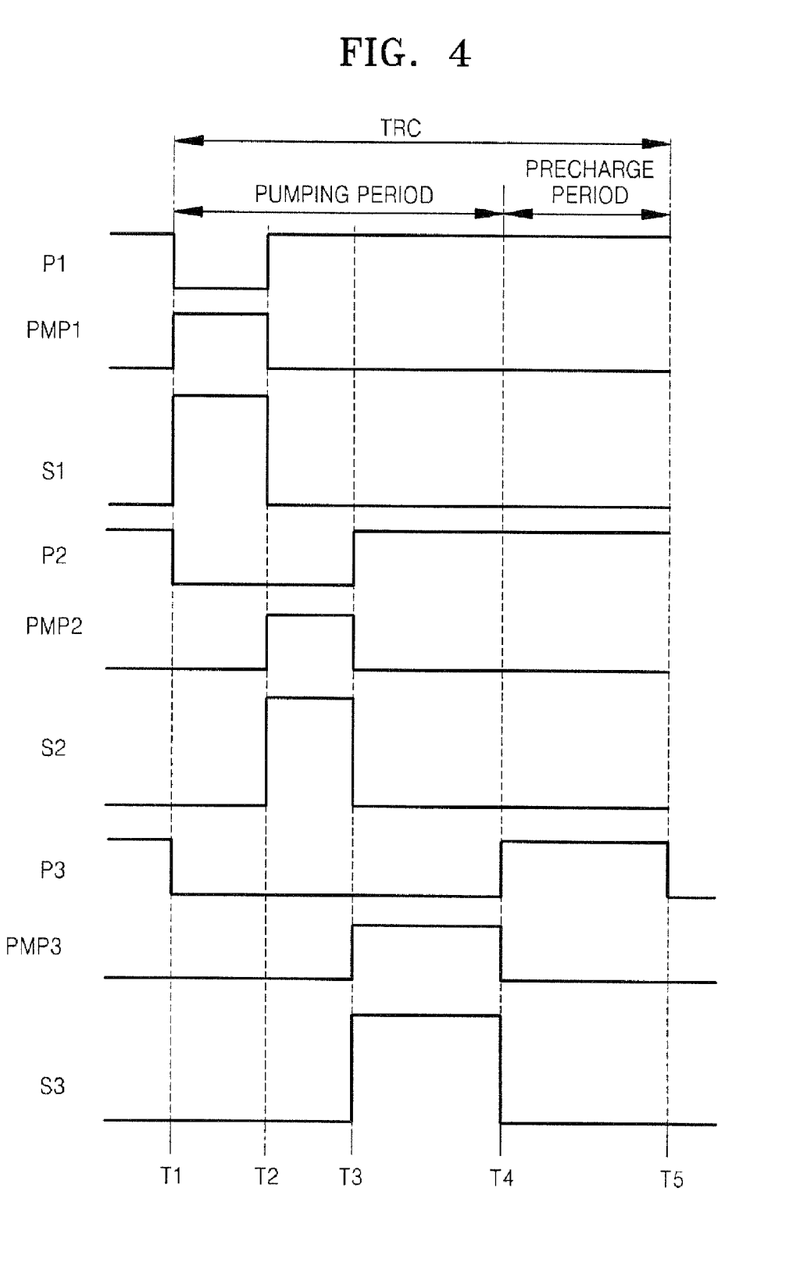
FIG. 4 is a timing diagram of the operation of the high voltage generator illustrated in FIG. 3.

FIG. 4 is a timing diagram of the operation of the high voltage generator illustrated in FIG. 3. Referring to FIGS. 3 and 4, the node N11 is boosted by the capacitor C11 and the node N21 is boosted by the capacitor C21 in response to the first pump signal PMP1 at a high level during a period between T11 and T2. At approximately the same time, the charge of the boosted node N11 and the charge of the boosted node N21 are respectively transferred to the node N31 and the node N22 through the transistor S24 and the transistor S23 turned on in response to the first switch signal S1 at a high level. That is, the period between T1 and T2 is the first pumping stage for the node 31.

The node N22 is boosted by the capacitor C22 in response to the second pump signal PMP2 at a high level during a period between T2 and T3. Simultaneously, the charge of the boosted node N22 is transferred to the node N31 through the transistor S25 turned on in response to the second switch signal S2 at a high level. That is, the period between T2 and T3 is the second pumping stage for the node 31.

The node N31 is boosted by the capacitor C31 in response to the third pump signal PMP3 at a high level during a period between T3 and T4. That is, the period between T3 and T4 is the third pumping stage for the node 31. The charge of the boosted node N31 generates the high voltage VPP through the transistor S31 turned on in response to the third switch signal S3 at a high level during the period between T3 and T4. The node N31 is precharged to the voltage VCC and maintains the voltage VCC during a period between T4 and T5, and thus the next pumping operation is carried out starting from the voltage VCC. Accordingly, pumping efficiency can be improved.

At the time T2, the first precharge signal P1 is transited to a high level, and thus the node N11 and the node N21 are respectively precharged to the voltage VCC through the transistor S11 and the transistor S21. Similarly, the second precharge signal P2 is transited to a high level at the time T3, and thus the node N22 is precharged to the voltage VCC through the transistor S22.

As described above, the high voltage generator 100 performs the pumping operation using the capacitors C11, C21, C22, and C31 and transfers the pumped charges to a high voltage output terminal using the charge transfer transistors S23, S24, S25, and S26 to generate the high voltage VPP.

The pumping efficiency of the high voltage generator 100 increases as the drain-source voltages and the gate-source voltages of the charge transfer transistors S23, S24, S25, and S31 increase.

Recently, the thickness of an oxide layer forming a transistor used in a semiconductor memory device has been continually reduced in order to increase the operating speed of the semiconductor memory device. However, the high voltage VPP maintains a high level for the high-speed operation of the semiconductor memory device.

That is, the thicknesses of oxide layers of the charge transfer transistors S23, S24, S25, and S31 are decreased while the drain-source voltages VDS and the gate-source voltages VGS of the charge transfer transistors S23, S24, S25, and S31 maintain levels for generating the high voltage VPP. Accordingly, strong electric fields may be generated in the drains of the charge transfer transistors S23, S24, S25, and S31 to cause hot carrier injection in the charge transfer transistors S23, S24, S25, and S31. The hot carrier injection will be explained in more detail with reference to FIGS. 5, 6, and 7.

Figure 5:
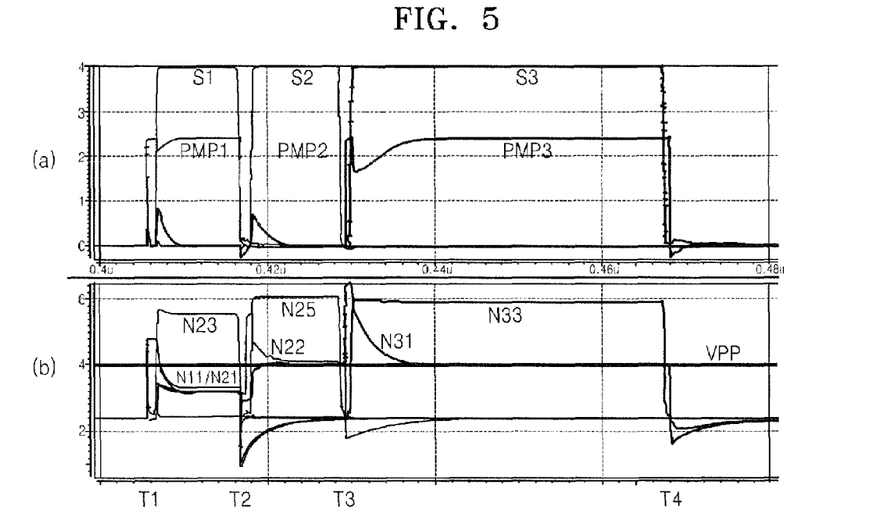
FIG. 5 is a timing diagram of voltages at nodes of the high voltage generator illustrated in FIG. 3.
Figure 6:
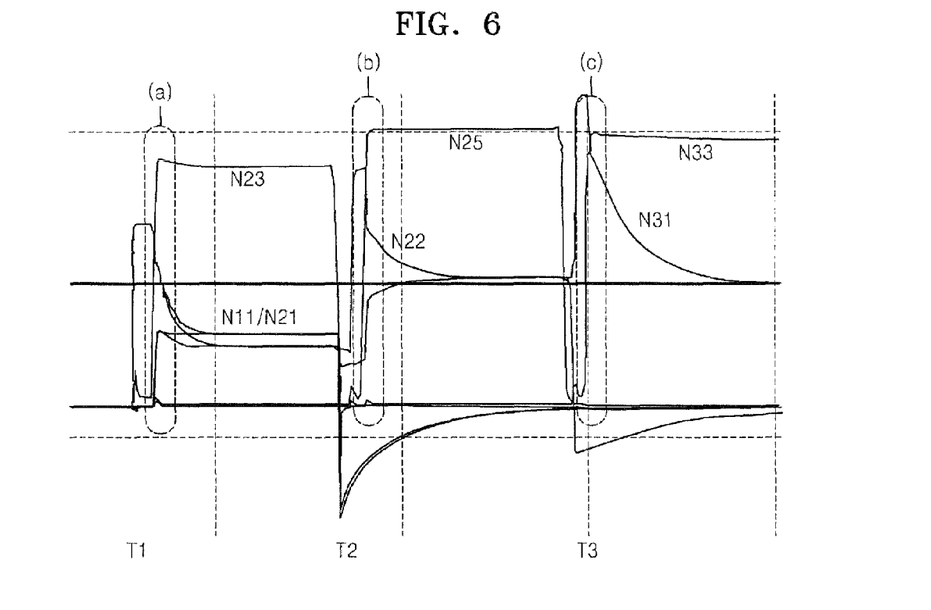
FIG. 6 is a timing diagram for explaining hot carrier injection occurring in charge transfer transistors illustrated in FIG. 3.

FIG. 5 is a timing diagram of voltages at nodes of the high voltage generator illustrated in FIG. 3. FIG. 5(a) illustrates timing where the first, second, and third switch signals S1, S2, and S3 and the first, second, and third pump signals PMP1, PMP2, and PMP3 are enabled and FIG. 5(b) illustrates the voltages of the gate nodes N23, N25, and N33 and the drain nodes N11/N21, N22, and N31 of the charge transfer transistors S23, S24, S25, and S31. FIG. 6 is a timing diagram for explaining hot carrier injection generated in the charge transfer transistors S23, S24, S25, and S31 illustrated in FIG. 3.

As described above, the gate node N23 of the charge transfer transistors S23 and S24 is boosted to the voltage corresponding to the sum of the voltage of the first switch signal S1 at a high level and the first power voltage in the first pumping stage. That is, the voltage of the gate node N23 is transited to the voltage corresponding to the sum of high voltages (for example, the high voltage VPP and the first power voltage VCC).

Accordingly, the charge transfer transistors S24 and S23 make the nodes N11 and N21, which are charge-pumped by the capacitors C11 and C21 in response to the voltage (high voltage VPP+power voltage VCC) of the gate node N23, and the nodes N22 and N31, which are precharged to the power voltage VCC, share charges in the first pumping stage. That is, the charge transfer transistors S24 and S23 transfer charges pumped to the nodes N11 and N21 to the nodes N22 and N31.

Referring to FIGS. 5 and 6, when the voltage of the gate node N23 is transited to the voltage corresponding to the sum of the high voltage VPP and the power voltage VCC at T1, the voltages of the drains (that is, the node N11 or the node N21) of the charge transfer transistors S24 and S23 may be higher than the voltage of the gates (that is, the node 23) of the charge transfer transistors S24 and S23. In this case, strong electric fields are generated in the drains of the charge transfer transistors S23 and S24, and thus hot carrier injection occurs in the charge transfer transistors S23 and S24.

In the second pumping stage, the charge transfer transistor S25 makes the nodes N22 and N31, which are charge-pumped by the capacitor C22 in response to the voltage (that is, high voltage VPP+power voltage VCC) of the gate node N25, share charges. That is, the charge transfer transistor S25 transfers charges pumped to the node N22 to the node N31.

Referring to FIGS. 5 and 6, when the voltage of the gate node N25 is transited to the voltage corresponding to the sum of the high voltage VPP and the power voltage VCC at T2, the drain (that is, the node N22) of the charge transfer transistor S25 may be higher than the voltage of the gate (that is, the node N25) of the charge transfer transistor S25. In this case, a strong electric field is generated in the drain of the charge transfer transistor S25, and thus hot carrier injection occurs in the charge transfer transistor S25.

In the third pumping stage, the charge transfer transistor S31 causes the nodes N33 charge-pumped by the capacitor C31 in response to the voltage (that is, high voltage VPP+power voltage VCC) of the gate node N33 and the high voltage output terminal VPP to share charges. That is, the charge transfer transistor S31 transfers charges pumped to the node N33 to the high voltage output terminal VPP.

Referring to FIGS. 5 and 6, when the voltage of the gate node N33 is transited to the voltage corresponding to the sum of the high voltage VPP and the power voltage VCC at T3, the drain (that is, the node N31) of the charge transfer transistor S31 may be higher than the voltage of the gate (that is, the node N33) of the charge transfer transistor S31. In this case, strong electric field is generated in the drain of the charge transfer transistor S31, and thus hot carrier injection occurs in the charge transfer transistor S31.

Figure 7:
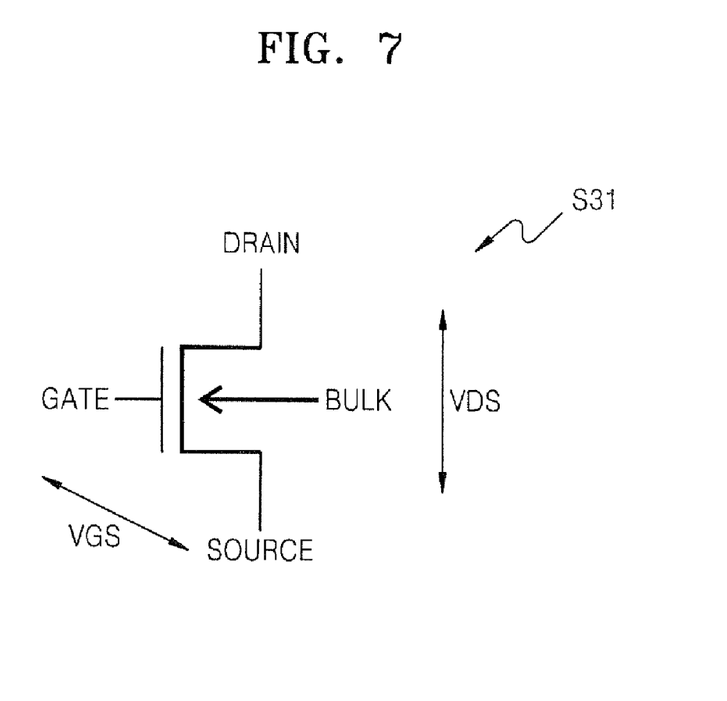
FIG. 7 is a circuit diagram for explaining the hot carrier injection occurring in a charge transfer transistor illustrated in FIG. 3.

The hot carrier injection occurring in the charge transfer transistor S31 will be explained with reference to FIG. 7. FIG. 7 is a circuit diagram for explaining the hot carrier injection generated in the charge transfer transistor S31 illustrated in FIG. 3.

Assuming that the power voltage VCC is 2.5V and the high voltage VPP is 4V, the peak levels of the drain voltages of the charge transfer transistors S23 and S24 correspond to VCC+VCC=2VCC (5V), the peak level of the drain voltage of the charge transfer transistor S25 corresponds to VCC+(2VCC+VCC)/2=2.5VCC (6.25V), and the peak level of the drain voltage of the charge transfer transistor S31 corresponds to VCC+(2.5VCC+VCC)=2.75VCC (6.875V).

The peak level of the gate voltage of the charge transfer transistor S31 corresponds to VCC+VPP (2.5+4=6.5V), and the source voltage of the charge transfer transistor S31 is 4V because the source of the charge transfer transistor S31 is connected to the high voltage output terminal VPP.

In FIG. 7, the gate-source voltage VGS of the charge transfer transistor S31 is 2.5V and its drain-source voltage VDS is 2.875V. That is, when the gate voltage of the charge transfer transistor S31 is transited, the drain voltage of the charge transfer transistor S31 becomes higher than its gate voltage. This generates hot carrier injection.

In the period during which pumped charges are transferred in the high voltage generator illustrated in FIG. 3, the drain voltages of the charge transfer transistors S23, S24, S25, and S31 arrive at their peak levels and then a pumping operation is executed on the gates of the charge transfer transistors S23, S24, S25, and S31. Thus, there is always a possibility that hot carrier injection occurs in the charge transfer transistors S23, S24, S25, and S26.

Accordingly, it is required to reduce the hot carrier injection without deteriorating pumping efficiency. The present invention uses a method of decreasing the drain voltages of the charge transfer transistors S23, S24, S25, and S31 when the gate voltages of the charge transfer transistors S23, S24, S25, and S31 are transited to reduce the hot carrier injection.

The configuration and operation of a high voltage generator 800 according to an embodiment of the present invention will be explained with reference to FIG. 8.

Figure 8:
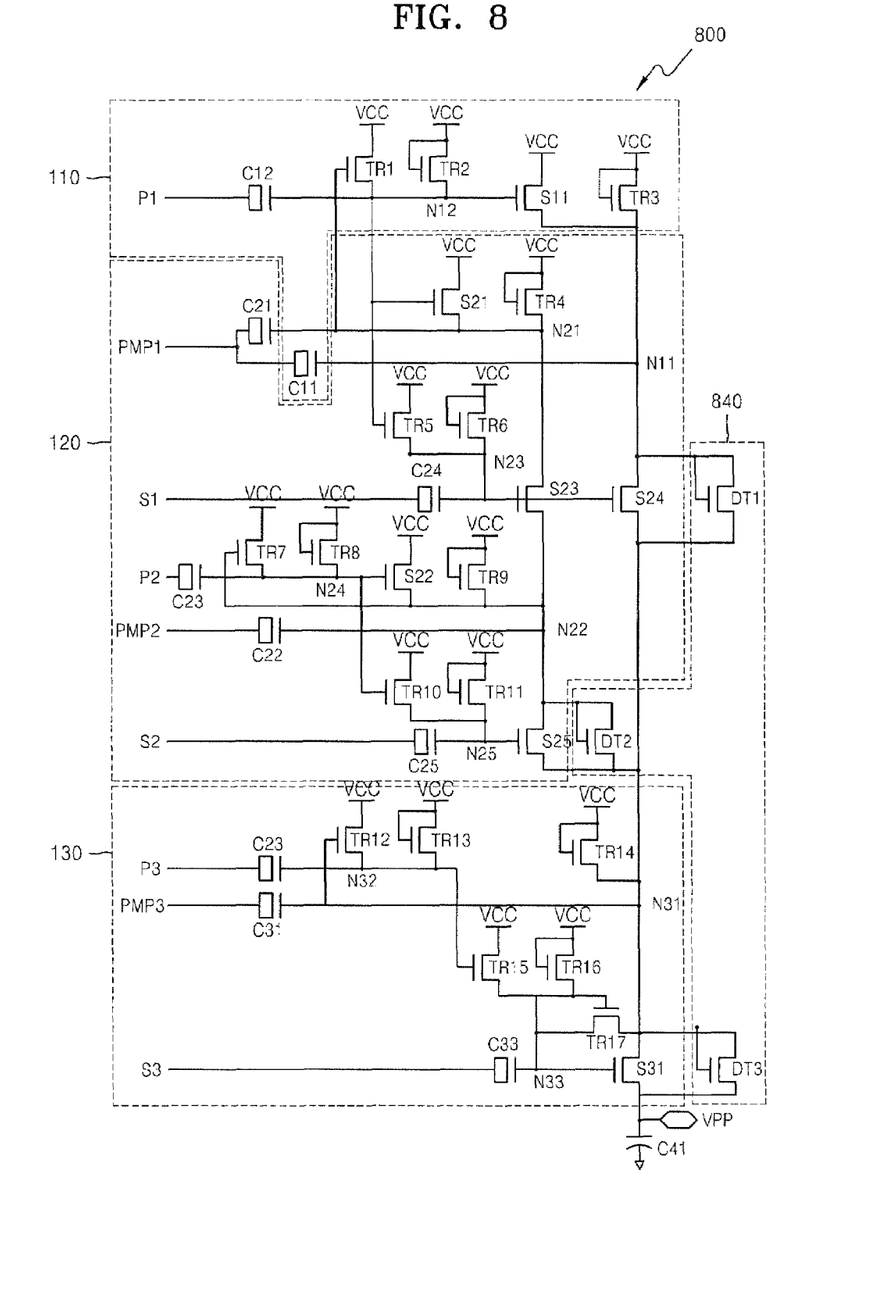
FIG. 8 is a circuit diagram of a high voltage generator according to an embodiment of the present invention.

FIG. 8 is a circuit diagram of the high voltage generator 800 according to an embodiment of the present invention. The high voltage generator 800 has the same configuration as the high voltage generator 100 illustrated in FIG. 3 and further includes a field relieving unit 840.

The high voltage generator 800 includes a high voltage output node VPP, a plurality of pumping stages 110, 120, and 130, a plurality of charge transfer elements S23, S24, S25, and S31, and the field relieving unit 840. The first pumping stage 110 includes a first capacitor C11 for pumping charges, and the second pumping stage 120 includes a second capacitor C21 and a third capacitor C22 for pumping charges and the charge transfer elements S23, S24, and S25 for transferring the pumped charges. The third pumping stage 130 includes a fourth capacitor C31 for pumping charges and the charge transfer element S31 for transferring the pumped charges. The charge transfer elements S23, S24, S25, and S31 are switches, which are identical to the charge transfer transistors S23, S24, S25, and S31 illustrated in FIG. 3. It will be understood by those of ordinary skill in the art that the number and arrangement of pump circuits are not limited.

The first, second and third pumping stages 110, 120, and 130 sequentially pump charges and output the pumped charges in response to a plurality of pump signals, respectively. Specifically, the first pumping stage 110 stores charges in the first capacitor C11 in response to a first pump signal PMP1 and outputs pumped charges to a first boost node N11 to boost the first boost node N11 is boosted.

The second pumping stage 120 stores charges in the second capacitor C21 in response to the first pump signal PMP1, stores charges in the third capacitor C22 in response to a second pump signal PMP2, and outputs pumped charges to a second boost node N21 and a third boost node N22. Accordingly, the second boost node N21 and the third boost node N22 are configured to have boosted voltages.

The third pumping stage 130 stores charges in the fourth capacitor C31 in response to a third pump signal PMP3 and outputs pumped charges to a fourth boost node N31 to boost the fourth boost node N31.

As illustrated in FIG. 4, the first, second, and third pump signals PMP1, PMP2, and PMP3 are sequentially enabled, and thus the first, second, and third pumping stages 110, 120, and 130 sequentially boost the first, second, third, and fourth boost nodes N11, N21, N22, and N31.

The plurality of charge transfer elements S23, S24, S25, and S31 sequentially transfer charges sequentially pumped by the first, second, and third pumping stages 110, 120, and 130 to output nodes of the next pumping stage. The charge of the output node N31 of the last pumping stage (that is, the third pumping stage 130) is transferred to the high voltage output node VPP. As described above the plurality of charge transfer elements S23, S24, S25, and S31 are switches in the present embodiment.

The operation of the plurality of charge transfer elements S23, S24, S25, and S31 according to an embodiment of the present invention will be explained in detail with reference to FIG. 8. The plurality of charge transfer elements S23, S24, S25, and S26 are NMOS transistors and transfer charges of boosted nodes to next nodes to be boosted in response to switch signals S1, S2, and S3 applied to the gates of the NMOS transistors.

Specifically, the first charge transfer transistor S24 transfers charges boosted to the first boost node N11 to the fourth boost node N31 in response to a first switch signal S1 applied to its gate. The second charge transfer transistor S23 transfers charges boosted to the second boost node N21 to the third boost node N22 in response to the first switch signal S1 applied to its gate. The third charge transfer transistor S25 transfers charges boosted to the third boost node N22 to the fourth boost node N31 in response to a second switch signal S2 applied to its gate. The fourth charge transfer transistor S31 transfers the charge of the output node N31 of the third pumping stage 130 to the high voltage output node VPP. That is, the fourth charge transfer transistor S31 transfers charges boosted to the fourth boost node N31 to the high voltage output node VPP in response to a third switch signal S3 applied to its gate.

As described above, when the gate voltages of the charge transfer transistors S23, S24, S25, and S31 are transited to a high level in response to the switch signals, the drain voltages of the charge transfer transistors S23, S24, S25, and S31 become higher than the gate voltages and thus strong electric fields are generated in the drains of the charge transfer transistors S23, S24, S25, and S31. As a result, hot carrier injection may occur in the charge transfer transistors S23, S24, S25, and S31.

The present invention reduces the drain voltages of the charge transfer transistors S23, S24, S25, and S31 when the gates of the charge transfer transistors S23, S24, S25, and S31 are transited to a high level in response to the switch signals using the field relieving unit 840.

Referring to FIG. 8, the field relieving unit 840 reduces the voltage of the input terminal of at least one of the charge transfer transistors S23, S24, S25, and S31. It is preferable that the field relieving unit 840 decrease the voltage of the input terminal of the fourth charge transfer transistor S31 that transfers the charge of the output node N31 of the last pumping stage 130 to the high voltage output node VPP. That is, it is preferable to reduce the drain voltage of the fourth charge transfer transistor S31.

The field relieving unit 840 reduces the drain voltages of the first charge transfer transistor S24, the third charge transfer transistor S25, and the fourth charge transfer transistor S31 in the present invention. However, it will be understood by those of ordinary skill in the art that the field relieving unit 840 can reduce the drain voltages of all the charge transfer transistors or the drain voltage of only a specific charge transfer transistor.

The field relieving unit 840 includes a forward diode connected in parallel with a charge transfer transistor whose drain voltage requires to be decreased. That is, the field relieving unit 840 includes a third forward diode DT1 for reducing the drain voltage of the first charge transfer transistor S24, a second forward diode DT2 for reducing the drain voltage of the third charge transfer transistor S25 and a first forward diode DT3 for reducing the drain voltage of the fourth charge transfer transistor S31.

The first forward diode DT3 reduces the drain voltage of the fourth charge transfer transistor S31 by a voltage applied to the first forward diode DT3. That is, when the gate voltage of the fourth charge transfer transistor S31 is transited to a high level in response to the third switch signal S3, the drain voltage of the fourth charge transfer transistor S31 becomes lower than the gate voltage of the fourth charge transfer transistor S31 according to the first forward diode DT3. Accordingly, hot carrier injection is reduced in the fourth charge transfer transistor S31.

The second forward diode DT2 and the third forward diode DT1 respectively perform the same operation as the operation of the first forward diode DT3 for the first charge transfer transistor S24 and the third charge transfer transistor S25.

The first, second, and third forward diodes DT3, DT2, and DT1 are forward diode-connected NMOS transistors, that is, NMOS transistors having gates connected to the drains of the charge transfer transistors, in the present embodiment. However, it will be understood by those of ordinary skill in the art that the forward diodes are not limited to the NMOS transistors. For example, the forward diodes can be PMOS transistors having gates connected to the sources of the charge transfer transistors.

The pumping stages for pumping charges and the charge transfer elements for transferring the pumped charges have been described in the aforementioned embodiment. Paths through which the pumped charges are transferred, that is, boost nodes, will be explained in the following embodiment of the present invention.

The high voltage generator 800 according to another embodiment of the present invention includes a high voltage output node VPP, a plurality of boost nodes N11, N21, N22, and N31, a plurality of switches S23, S24, S25, and S31, and a field relieving unit 840. The plurality of boost nodes N11, N21, N22, and N31 are sequentially boosted in response to sequentially enabled plurality of pump signals PMP1, PMP2, and PMP3, respectively. That is, the first boost node N11 and the second boost node N21 are boosted in response to the first pump signal PMP1. The third boost node N22 is boosted in response to the second pump signal PMP2 and the fourth boost node N31 is boosted in response to the third pump signal PMP3.

The plurality of switches S23, S24, S25, and S31 sequentially connect the boost nodes N11, N21, N22, and N31 to the high voltage output node VPP such that charges boosted to a boost node are transferred to the next boost node and charges boosted to the finally boosted node are transferred to the high voltage output node VPP.

Specifically, the first switch S24 connects the first boost node N11 to the fourth boost node N31 in response to a first switch signal S1 to transfer charges boosted to the first boost node N21 to the fourth boost node N31. The second switch S23 connects the second boost node N21 to the third boost node N22 in response to the first switch signal S1 to transfer charges boosted to the second boost node N22 to the third boost node N22.

The third switch S25 connects the third boost node N22 to the fourth boost node N31 in response to a second switch signal S2 to transfer charges boosted to the second boost node N22 to the fourth boost node N31. The fourth switch S31 connects the finally boosted fourth boost node N31 to the high voltage output node VPP in response to a third switch signal S3 to transfer charges boosted to the fourth boost node N31 to the high voltage output node VPP.

The field relieving unit 840 reduces the voltage of one of terminals of at least one of the plurality of switches S23, S24, S25, and S31, that is, a terminal to which transferred charges are input. It is preferable that the field relieving unit 840 decrease the voltage of one of terminals of the switch S31 that connects the finally boosted node N31 to the high voltage output node VPP.

In the present embodiment, the field relieving unit 840 reduces the voltage of one of terminals of the first switch S24, the voltage of one of terminals of the third switch S25, and the voltage of one of terminals of the fourth switch S31. However, it will be understood by those of ordinary skill in the art that the field relieving unit 840 can reduce the voltage of one of terminals of each of all the switches S23, S24, S25, and S31 or the voltage of one of terminals of only a specific switch.

Referring to FIGS. 4 and 8, the plurality of switches S23, S24, S25, and S31 are MOS transistors sequentially turned on in response to the sequentially enabled switch signals S1, S2, and S3. The field relieving unit 840 includes at least one forward diode DT1, DT2, and DT3 connected in parallel with a switch. The forward diode reduces the voltage of one of terminals of the switch, that is, the voltage of the drain of the switch.

The forward diodes DT1, DT2, and DT3 are forward diode-connected NMOS transistors, that is, NMOS transistors having gates connected to the drains of the switches, in the present embodiment. However, it will be understood by those of ordinary skill in the art that the forward diodes are not limited to the NMOS transistors. For example, the forward diodes can be PMOS transistors having gates connected to the sources of the switches.

Figure 9:
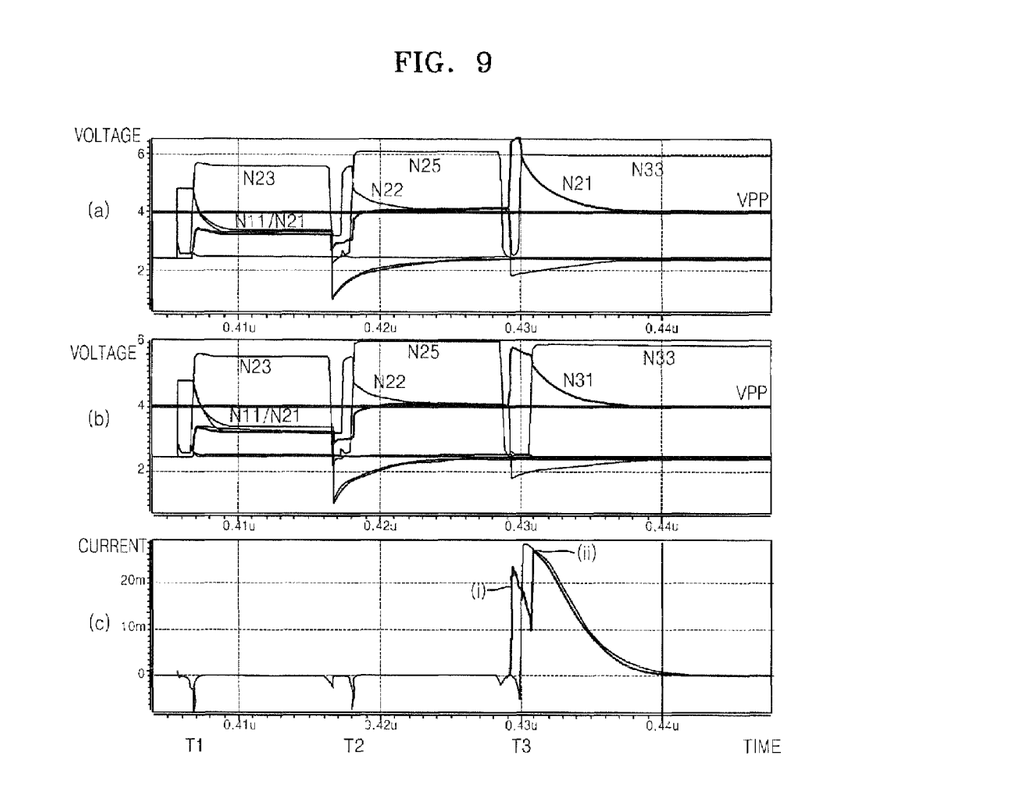
FIG. 9 is a timing diagram of the operation of the high voltage generator according to an embodiment of the present invention.

FIG. 9 is a timing diagram of the operation of the high voltage generator according to an embodiment of the present invention. FIG. 9(a) illustrates voltages of nodes of the high voltage generator illustrated in FIG. 3, FIG. 9(b) illustrates voltages of nodes of the high voltage generator illustrated in FIG. 8, and FIG. 9(c) illustrates current transferred to the high voltage output node.

Referring to FIG. 9, when the gate voltage (voltage of the node N33) of the fourth charge transfer transistor S31 is transited to a high level at T3, the drain voltage (voltage of the node N31) of the fourth charge transfer transistor S31 is higher than the gate voltage (voltage of the node N33) in the high voltage generator illustrated in FIG. 3 (refer to FIG. 9(a)). However, the drain voltage (voltage of the node N31) becomes lower than the gate voltage (voltage of the node N33) in the high voltage generator illustrated in FIG. 8.

That is, while a strong electric field is generated in the drain of the fourth charge transfer transistor S31 to generate hot carrier injection in the high voltage generator illustrated in FIG. 3, a strong electric field is not generated in the drain of the fourth charge transfer transistor S31. Thus, hot carrier injection is remarkably reduced in the drain of the fourth charge transfer transistor S31 for the embodiment illustrated in FIG. 8.

In FIG. 9(c), (i) represents current provided to the high voltage output node VPP in the high voltage generator 800 illustrated in FIG. 8 and (ii) represent current provided to the high voltage output node VPP in the high voltage generator 300 illustrated in FIG. 3. As illustrated in FIG. 9(c), the current provided to the high voltage output node VPP does not much vary when the field relieving unit is added. That is, pumping efficiency is maintained even when the field relieving unit is added.

As described above, the high voltage generator according to the present invention can reduce hot carrier injection in charge transfer transistors without decreasing pumping efficiency. Accordingly, the efficiency of a semiconductor memory device using the high voltage generator can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A high voltage generator comprising:
a high voltage output node;
a plurality of boost nodes configured to be sequentially boosted by a plurality of pump circuits in response to a sequentially enabled plurality of pump signals;
a plurality of switches configured to sequentially connect the boost nodes and the high voltage output node such that charges boosted to a boost node are transferred to a subsequently boosted boost node and charges boosted to a last boosted boost node of the plurality of boost nodes are transferred to the high voltage output node; and
a field relieving unit connected to at least one of the plurality of switches and configured to reduce a voltage of one terminal of at least one of the plurality of switches when the boosted charges are transferred across the at least one of the plurality of switches,
wherein the field relieving unit comprises at least one forward diode connected in parallel with at least one of the plurality of switches.

2. The high voltage generator of claim 1, wherein the field relieving unit is configured to reduce the voltage of one terminal of at least a switch that connects the finally boosted node to the high voltage output node.

3. The high voltage generator of claim 1, wherein the plurality of switches are MOS transistors configured to be sequentially turned on in response to a sequentially enabled plurality of switch signals.

4. The high voltage generator of claim 1, wherein the forward diode is a forward diode-connected MOS transistor.

5. The high voltage generator of claim 4, wherein the forward diode-connected MOS transistor is an NMOS transistor having a gate connected to one of the plurality of switches.

6. The high voltage generator of claim 4, wherein the forward diode-connected MOS transistor is a PMOS transistor having a gate connected to one of the plurality of switches.

7. A high voltage generator comprising:
a high voltage output node;
a plurality of pumping stages configured to sequentially pump charges in response to a sequentially enabled plurality of pump signals and output the pumped charges;
a plurality of charge transfer elements configured to sequentially transfer the charges sequentially pumped by the plurality of pumping stages to a next pumping stage and transfer the charge of an output node of a last pumping stage to the high voltage output node; and
a field relieving unit connected to at least one of the plurality of switches and configured to reduce a voltage of an input terminal of at least one of the plurality of charge transfer elements,
wherein the field relieving unit comprises at least one forward diode connected in parallel with at least one of the plurality of charge transfer elements.

8. The high voltage generator of claim 7, wherein the plurality of pumping stages include capacitors configured to respectively pump charges in response to the pump signals.

9. The high voltage generator of claim 7, wherein the field relieving unit reduces a voltage of an input terminal of at least one of the plurality of charge transfer elements that transfers the charge of the output node of the last pumping stage to the high voltage output node.

10. The high voltage generator of claim 7, wherein the plurality of charge transfer elements are MOS transistors configured to be turned on in response to a sequentially enabled plurality of switch signals.

11. The high voltage generator of claim 7, wherein the forward diode is a forward diode-connected MOS transistor.

12. The high voltage generator of claim 11, wherein the forward diode-connected MOS transistor is an NMOS transistor having a gate connected to a terminal of one of the plurality of charge transfer elements.

13. The high voltage generator of claim 11, wherein the forward diode-connected MOS transistor is a PMOS transistor having a gate connected to a terminal of one of the plurality of charge transfer elements.

14. A high voltage generator comprising:
a first pumping stage configured to boost a first boost node in response to a first pump signal;
a second pumping stage configured to boost a second boost node in response to the first pump signal and boost a third boost node in response to a second pump signal;
a third pumping stage configured to boost a fourth boost node in response to a third pump signal;
a first switch configured to connect the second boost node to the third boost node in response to a first switch signal;
a second switch configured to connect the first boost node to the fourth boost node in response to the first switch signal;
a third switch configured to connect the third boost node to the fourth boost node in response to a second switch signal;
a fourth switch configured to connect the fourth boost node to a high voltage output node in response to a third switch signal; and
a field relieving unit connected to at least one of the first, second, third, or fourth switches and configured to reduce the voltage of the input terminal of at least one of the first, second, third, or fourth switches, wherein the field relieving unit comprises a first forward diode that is connected in parallel with the fourth switch and is configured to reduce the voltage of the input terminal of the fourth switch.

15. The high voltage generator of claim 14, wherein the field relieving unit further comprises a second forward diode that is connected in parallel with the third switch and is configured to reduce a voltage of an input terminal of the third switch.

16. The high voltage generator of claim 14, wherein the field relieving unit further comprises a third forward diode that is connected in parallel with the second switch and is configured to reduce a voltage of an input terminal of the second switch.

17. The high voltage generator of claim 14, wherein the field relieving unit further includes a second forward diode connected in parallel with the third switch to reduce a voltage of an input terminal of the third switch, and a third forward diode connected in parallel with the second switch to reduce a voltage of an input terminal of the second switch.

* * * * *

UNITED STATES PATENT AND TRADEMARK OFFICE
CERTIFICATE OF CORRECTION

PATENT NO. : 7,573,321 B2 Page 1 of 1
APPLICATION NO. : 11/858071
DATED : August 11, 2009
INVENTOR(S) : Dong-Myung Eun et al.

It is certified that error appears in the above-identified patent and that said Letters Patent is hereby corrected as shown below:

Column 5, line 12, the word "T11" should read -- T1 --.

Signed and Sealed this

Twenty-fourth Day of November, 2009

David J. Kappos
*Director of the United States Patent and Trademark Office*